May 5, 1925.  W. H. NEELY  1,536,404
DOUBLE UNDERSLUNG TIRE CARRIER
Filed Jan. 9, 1924
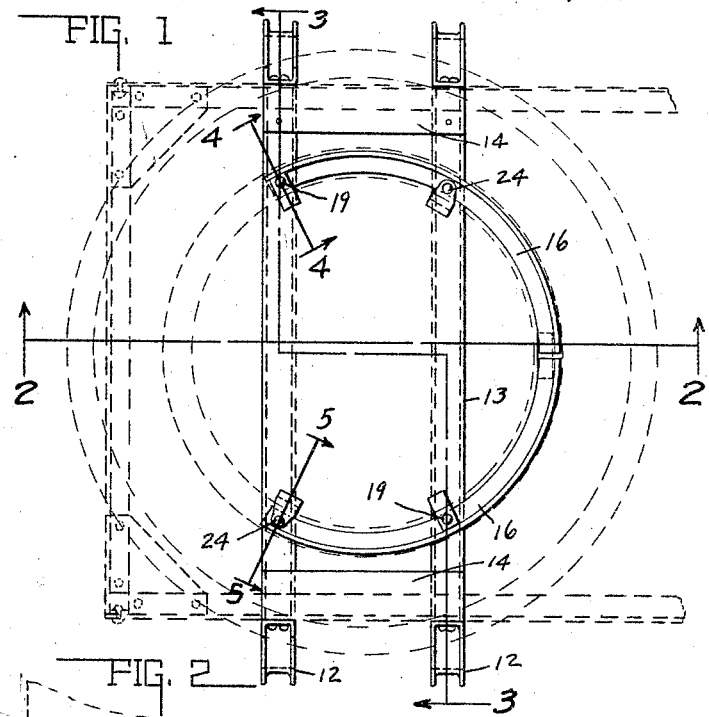
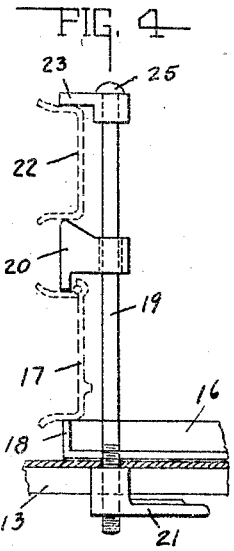
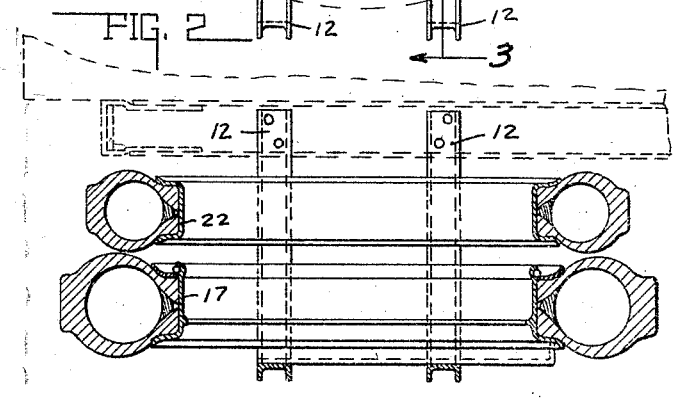
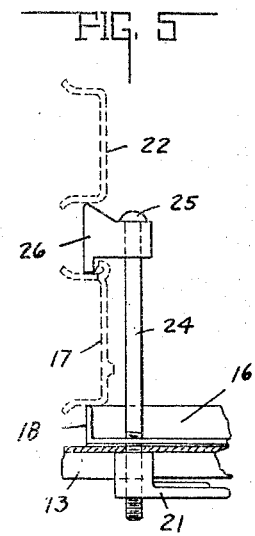
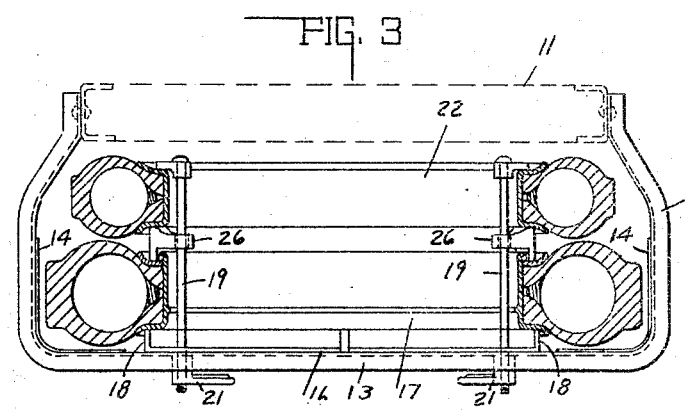
INVENTOR.
WILLIAM H. NEELY.
ATTORNEYS.

Patented May 5, 1925.

1,536,404

UNITED STATES PATENT OFFICE.

WILLIAM H. NEELY, OF DETROIT, MICHIGAN, ASSIGNOR TO GRAHAM BROTHERS, OF EVANSVILLE, INDIANA, A CORPORATION.

DOUBLE UNDERSLUNG TIRE CARRIER.

Application filed January 9, 1924. Serial No. 685,135.

*To all whom it may concern:*

Be it known that I, WILLIAM H. NEELY, a citizen of the United States, and a resident of Detroit, county of Wayne, and State of Michigan, have invented a certain new and useful Double Underslung Tire Carrier; and I do hereby declare that the following is a full, clear, and exact description thereof, reference being had to the accompanying drawings, in which like numerals refer to like parts.

This invention relates to an underslung platform tire carrier adapted particularly for use in carrying a plurality of spare tires on motor trucks. This type of tire carrier is principally adapted for use on trucks having rearwardly-extending overhanging bodies, permitting of sufficient space thereunder in the rear of the wheels for carrying spare tires.

The object of this invention is to provide an underslung platform or tire rack of convenient arrangement which will be of light but sturdy construction, adapted for supporting a plurality of spare tires in accessible position and spaced from each other so that there will be no rubbing or wearing contact therebetween, reference being had to my application Serial No. 666,751, filed October 5, 1923, pertaining to a similar tire rack adapted for carrying a single tire.

Another feature of the invention resides in the arrangement of the supporting and clamping members such as to secure both tires in position and maintain them in spaced relation.

The full nature of the invention will be understood from the accompanying drawings and the following description and claim:

In the drawings, Figure 1 is a plan view looking down on the tire carrier, showing a plurality of tires mounted thereon. Fig. 2 is a section taken on the line 2—2 of Fig. 1. Fig. 3 is a section taken on the line 3—3 of Fig. 1. Fig. 4 is a section taken on the line 4—4 of Fig. 1. Fig. 5 is a section taken on the line 5—5 of Fig. 1.

In the drawings there is shown the rear end of a truck bed 10 mounted upon the usual frame 11, forming a part of the chassis of the truck. It will be noted that in this type of truck the truck body or bed 10 extends rearwardly a substantial distance from the rear axle and wheels. This permits of a convenient place for supporting the spare tires on an underslung or suspended tire rack, as will be hereinafter described.

The tire rack comprises a pair of metal straps or stirrups 12 riveted or otherwise secured to each side of the frame 11, as shown in Fig. 3. The straps 12 are curved outwardly and extend downwardly so as to give sufficient clearance for the maximum diameter of the tires to be carried. The lower end of the straps 12 are connected by a transverse portion 13 which may be formed integral therewith. In other words, the straps may extend from one side of the chassis to the other, properly curved to form the horizontal portion or platform 13, said horizontal portion or platform extending directly across the body of the truck from one side to the other and spaced from the bed 10 sufficiently to permit the free manipulation of the tires to be carried thereby. As there is provided a pair of such straps on each side of the frame spaced apart a distance of substantially one-third of the diameter of the tire, there will likewise be two transverse or supporting platform portions 13 spaced apart the same distance and extending parallel with each other. Said straps may be braced by the bracing irons 14 for maintaining their rigidity.

Rigidly mounted upon the transverse portions or platform portions 13 there are sectional locating rings 16, said rings having the same curvature as the tire to be carried and so arranged as to fit against the inner periphery of the lower tire rim 17 when centrally positioned thereon. As shown herein there are two sectional rings 16, each of which has one end rigidly secured to the forward platform bar 13, and the other end extending beyond the rear bar, thereby completing two-thirds of a circle and having its center midway between the two platform bars 13 and side frame bars 11. The free ends of the sectional locating rings are slightly spaced apart, as shown in Fig. 1, and are held securely in fixed position by reason of the riveting of said sectional rings to the platform bars 13. As shown in Fig. 2, the lower tire rim 17 is positioned upon and supported directly by the upwardly-extending flanges 18 of said rings so as to withhold the sides of the tire from contact with the platform bars or straps 12.

Extending through the ring 16 and platform bars 13 there are clamping rods 19 positioned diagonally of said ring, as shown in Fig. 1. Said rods are screw threaded intermediate their ends and are provided with an intermediate clamping and supporting head 20 which is screw threaded thereon and supported intermediate the ends thereof by said screw threads. Said clamping head is adapted to engage the upper side of the lower rim 17 and rigidly clamp it upon the supporting flange 18 of the ring 16 upon drawing said rod downwardly by means of a clamping nut 21 which screws on the lower end thereof in engagement with the underside of said platform bars. On the other hand, the head 20 is so arranged as to support an upper tire rim 22 immediately above the rim 17 and in spaced relation therewith. Mounted at the upper end of the rod 19 there is a clamping member 23 adapted to engage the upper side of the upper tire rim 22 and clamp it rigidly against the head 20 so as to hold it firmly in position.

The clamping rods 24, as shown in Fig. 5, are likewise diametrically positioned on said ring so as to extend through said platform bars, as shown in Fig. 1, for clamping only the lower tire rim 17 thereon, but supporting the upper tire rim 22. The lower rim is likewise threaded to receive the clamping nut 21 and has slidably mounted thereon and engaged by the head 25, the clamping and supporting head 26. It will be observed from the foregoing that there are four clamping rods, each having supporting heads thereon for supporting the upper rim 22, but only two of which are provided with clamping members 23 for clamping and maintaining the upper rim 22 upon the clamping and supporting heads 26. It will be obvious, therefore, that when only the lower rim is carried, the clamping rods 19 and their fittings may be eliminated and not used. For removing the upper tire, only the two clamping rods 19 need be manipulated for releasing it; and then in removing the lower rim, only the two clamping rods 24 and their fittings need be manipulated. This arrangement facilitates the removal of the several tire rims as will be understood from the foregoing.

The invention claimed is:

The combination with a vehicle frame, of a double tire carrier suspended therefrom and positioned directly beneath the same, comprising a supporting frame suspended from said vehicle frame, a clamping rod, a head mounted on said rod in position to extend between said tires for maintaining them in spaced relation with each other, a clamping member mounted on said rod in position to engage the upper tire and clamp it against the lower tire and frame for maintaining the same in fixed position, and a second rod having a clamping and supporting head thereon in position to engage and clamp said lower tire rigidly in said frame and providing a support for said upper tire in spaced relation thereto.

In witness whereof I have hereunto affixed my signature.

WILLIAM H. NEELY.